United States Patent
Whatley, Jr.

[19]

[11] Patent Number: 5,934,164
[45] Date of Patent: *Aug. 10, 1999

[54] CUTTING SYSTEM FOR SHAPING TRUSSES

[75] Inventor: Otis Barto Whatley, Jr., Culleoka, Tenn.

[73] Assignee: V.P.T. Equipment Co., Mabank, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,389

[22] Filed: May 13, 1997

[51] Int. Cl.⁶ .................................................. B23D 19/04
[52] U.S. Cl. .............................. 83/471.1; 83/156; 83/72; 83/391; 83/471.3
[58] Field of Search .......................... 83/155, 156, 468.2, 83/468.6, 468.7, 72, 391, 452, 486, 488, 471.3, 471.1, 109

[56] References Cited

U.S. PATENT DOCUMENTS

| | | | |
|---|---|---|---|
| 2,545,667 | 3/1951 | Malnati | 83/109 |
| 3,141,367 | 7/1964 | Keener et al. | 83/468.6 |
| 3,251,388 | 5/1966 | Ennis | 144/3 |
| 3,459,082 | 8/1969 | Smith et al. | 83/471.2 |
| 3,540,498 | 11/1970 | Woloveke | 83/471.1 |
| 3,662,795 | 5/1972 | Heflin | 83/471.1 |
| 3,718,061 | 2/1973 | Wilkin | 83/468.6 |
| 4,335,637 | 6/1982 | Kaltenbach | 83/452 |
| 4,369,684 | 1/1983 | Perman et al. | 83/216 |
| 4,454,794 | 6/1984 | Thornton | 83/471.3 |
| 4,640,161 | 2/1987 | Kurk | 83/104 |
| 5,483,856 | 1/1996 | Smitterberg et al. | 83/468.6 |
| 5,542,325 | 8/1996 | Bane, III | 83/468.6 |

Primary Examiner—M. Rachuba
Assistant Examiner—Sean Pryor
Attorney, Agent, or Firm—Locke Liddell & Sapp LLP

[57] ABSTRACT

A cutting system for removing at least one section from a workpiece. The cutting system includes a frame that supports a first saw assembly for cutting at one end of the workpiece and a second assembly for cutting at the other end of the workpiece. The first saw assembly supports a stop having an up position (non-cutting position) or a down position (cutting position). For measurement purposes, the one end of the uncut workpiece is placed next to the stop in the non-cutting position and during the cutting operation the stop moves below the workpiece. The cutting system also includes a first clamp connected to the first saw assembly and a second clamp connected to the second saw assembly or the frame. The first and second clamps have either an opened position or closed position. The workpiece is secured when the first and second clamps are in the closed position. The closed position also enables the operation of the first and second saw assemblies. Whereas an opened position releases the cut workpiece or permits the positioning of an uncut workpiece into the cutting system.

4 Claims, 2 Drawing Sheets

CUTTING SYSTEM FOR SHAPING TRUSSES

TECHNICAL FIELD

The present invention relates generally to a cutting system and, more particularly, to a cutting system for removing at least one section simultaneously from both ends of a workpiece that is properly positioned and secured prior to the cutting process.

BACKGROUND OF THE INVENTION

Cutting systems utilize a combination of saws and conveyors to shape workpieces to be used, for example, as components for trusses that are used in the construction industry. The workpieces include cords and webs that are comparable to rafters, joists and braces. A workpiece may require up to four separate cuts before being properly shaped for a particular application. For example, a web requires two cuts at one end of the workpiece and another two cuts at the other end of the workpiece. The workpiece is generally lumber having dimensions of 1½" thick, 4" wide to 12" wide, and 20' long.

Traditional cutting systems utilize a chain feed to move the workpiece through the saws. The movement of the chain feed and workpiece during the cutting process is dangerous to an operator. The most likely danger being where the operator would become entangled in the chain feed while the saws are operating.

Generally, at least two people are required to operate the cutting system where one person positions the uncut workpiece at a front end of the saws while a second person located on the opposite side of the saw receives the workpiece that has been cut. Of course, the cutting system is inherently dangerous when there is more than one operator handling a workpiece during the cutting operation.

Operating a cutting system also requires valuable time and effort on the operator's part to determine the correct location of each cut. It is not uncommon for the operator to make several measurements before the cutting operation on a workpiece is finished. Even the cutting systems that are computer aided require operator training before the operator is able to efficiently utilize the cutting system.

U.S. Pat. No. 4,640,161, issued to Kurk, discloses a woodpiece cutting apparatus that has a saw located on each side of a 2"×4" piece of lumber. The lumber is moved along a guide into a cutting position where the piece to be removed is secured by a movable holder at the end of the guide. An operator in positioning the lumber must separately measure the location of each cut, which can be time consuming and lead to quality control problems by removing too much or little from the lumber. Also, the operator must rotate the lumber to make cuts at the other end of the lumber.

Accordingly, there is a need for a cutting system that safely secures a workpiece during the cutting operation. Also there is a need to correctly and easily position the workpiece onto the cutting system prior to cutting. These and other needs are addressed by the cutting system of the present invention.

SUMMARY OF THE INVENTION

The present invention is a cutting system for removing at least one section from a workpiece. The cutting system includes a frame that supports a first saw assembly for cutting at one end of the workpiece and a second assembly for cutting at the other end of the workpiece. The first saw assembly supports a stop having an up position (non-cutting position) or a down position (cutting position). For measurement purposes, the one end of the uncut workpiece is placed next to the stop in the non-cutting position and during the cutting operation the stop moves below the workpiece. The cutting system also includes a first clamp connected to the first saw assembly and a second clamp connected to the second saw assembly or the frame. The first and second clamps have either an opened position or closed position. The workpiece is secured when the first and second clamps are in the closed position. The closed position also enables the operation of the first and second saw assemblies. Whereas an opened position releases the cut workpiece or permits the positioning of an uncut workpiece into the cutting system.

In accordance with the present invention there is provided a cutting system having a stop that correctly and easily positions the workpiece onto the cutting system.

Also in accordance with the present invention there is provided a cutting system having a pair of clamps that secure a workpiece while the cuts are being made, and releases the workpiece after the cutting has been completed.

Further in accordance with the present invention there is provided a cutting system relatively easy to operate and construct.

Also in accordance with the present invention there is provided a cutting system designed for a production environment having a high volume of output for simultaneously cutting both ends of a workpiece.

BRIEF DESCRIPTION OF THE DRAWINGS

A more complete understanding of the present invention and the advantages thereof may be had by reference to the following Detailed Description when taken into conjunction with the accompanying Drawings wherein.

DETAILED DESCRIPTION

Figure 1:
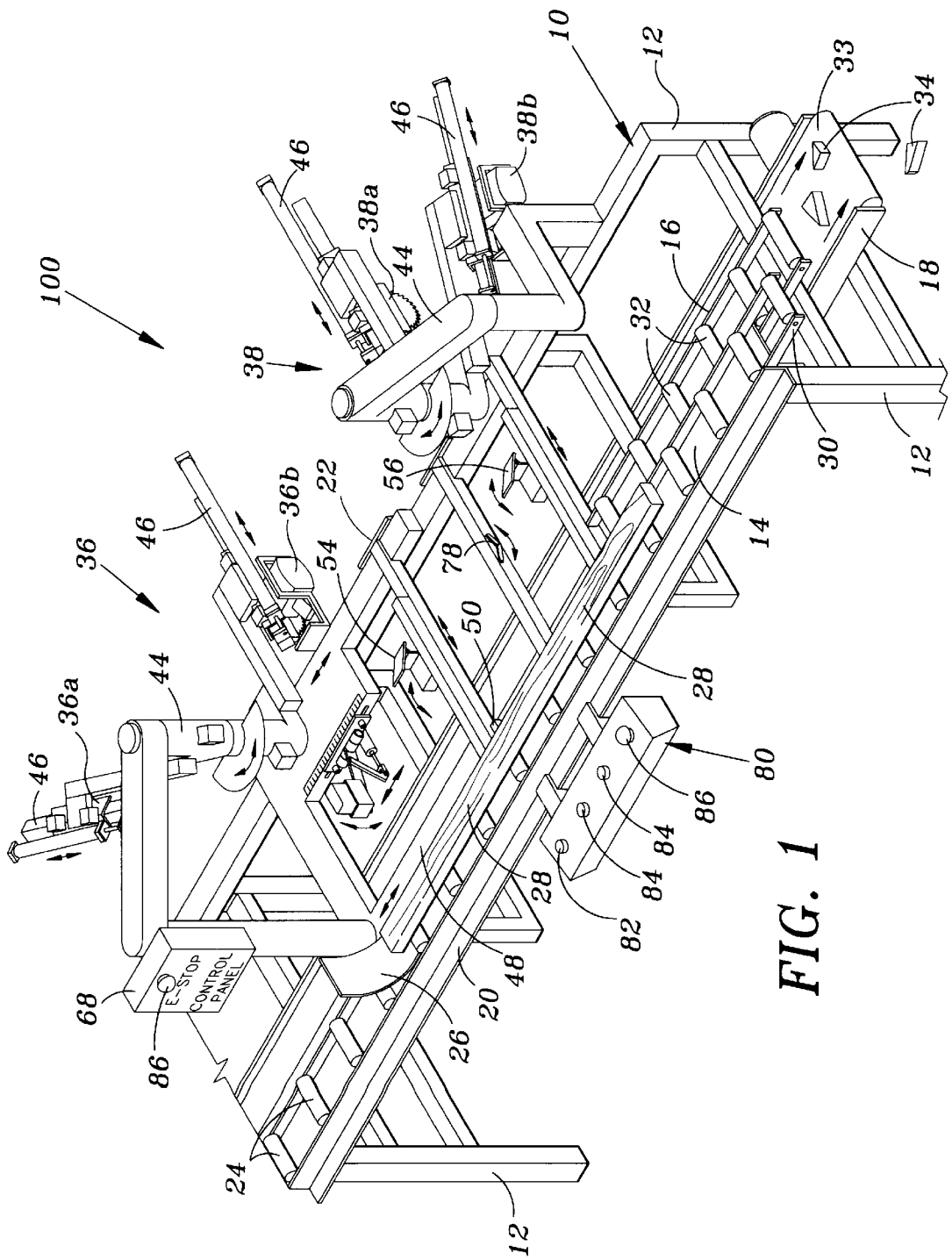
FIG. 1 is a perspective view of a cutting system of the present invention.

Referring to the Drawings, wherein like numerals represent like parts throughout the several views, there is generally disclosed a cutting system 100 in accordance with the present invention.

Although a preferred embodiment of the cutting system 100 that cuts lumber to manufacture trusses will be discussed, those skilled in the art will appreciate that such an application is only one of many utilizing the principles of the present invention. Accordingly, the described cutting system 100 should not be construed in a limiting manner.

In order to better present and describe the preferred embodiment of the present invention a detailed description of the operation of the cutting system 100 will be deferred pending a discussion of the mechanical aspects of the cutting system.

Referring to FIG. 1, there is illustrated a perspective view of the cutting system 100. The cutting system 100 has a frame 10 supported by legs 12. The frame 10 supports an infeed conveyor 14, an outfeed conveyor 16 and a waste conveyor 18 that are preferably located at different vertical levels on the frame 10. The infeed conveyor 14 is adjacent a front side 20 of the frame 10 and located on a top of the frame 10. The outfeed conveyor 16 is offset from and below the infeed conveyor 14. The waste conveyor 18 is adjacent a back side 22 of the frame 10 and offset from and below the outfeed conveyor 16.

The infeed conveyor 14 further includes a plurality of idler rollers 24. The length of the infeed conveyor 14 is generally the same length as the frame 10. A first saw assembly 36 having saws 36a and 36b and second saw assembly 38 having saws 38a and 38b are slidably attached or secured to the back side 22 of the frame 10. A barrier 26 demountably attached to the first saw assembly 36 is provided to effectively stop at a predetermined location on the infeed conveyor a workpiece 28 that has been placed onto the idler rollers 24 and pushed from an end 30 of the infeed conveyor 14. Without the barrier 26 a workpiece 18 that has been pushed would likely travel the entire length of the infeed conveyor 14 before stopping. The final cut length of the workpiece 28 roughly corresponds to the distance between saw assemblies 36 and 38.

The outfeed conveyor 16 is located on the frame 10 and further includes a plurality of idler rollers 32 that aid the operator in removing the workpiece 28 that has been cut. Typically the outfeed conveyor 16 is a fraction of the length of the infeed conveyor 14 and is positioned near the end 30 of the infeed conveyor 14.

The waste conveyor 18 is located on the frame 10 and further includes an endless belt 33 which generally runs the entire length of the frame 10. The waste conveyor 18 receives scrap material 34 that was cut from the workpiece 28 and transports the scrap material away from the cutting system 100.

The first and second saw assemblies 36 and 38 each have a pair of saws that remove at least one front section 40 and at least one back section 42 from the ends of the workpiece 28, respectively. The quantity of front and back sections 40 and 42 that are removed depends upon whether a cord or web type of truss component is required. The removed front and back sections 40 and 42 are considered scrap material 34.

The pair of saws associated with each of the first and second saw assemblies 36 and 38 are independently and adjustably connected to a mount 44. The saws are generally circular saws with direct drives and indirect drives. Each saw is positioned on one side of the workpiece 28 and adapted for movement across the workpiece 28 by actuating hydraulic or pneumatic cylinders 46. The saws alternately or simultaneously remove the front and back sections 40 and 42 by moving back and forth across the workpiece 28. Each saw is individually positioned to cut at various angles and orientations in relation to the workpiece 28.

The first saw assembly 36 is preferably slidably attached to the frame 10 and the second saw assembly 38 is mounted to the frame such that only the first saw assembly need be repositioned in response to a change in the final cut length of the workpiece 28. The slidable attachment of the first saw assembly 36 to the frame 10 preferably includes a track 48 with a tongue and groove 50 type locking mechanism. Other slidable attachments such as rollers, cables and gantry type configurations are permissible.

The second saw assembly 38 is generally secured to the frame 10 such that only the first saw assembly 36 need be relocated to accommodate a change in the final cut length of the workpiece 28. However, the second saw assembly 38 may be slidably attached in the same manner as the first saw assembly 36.

Figure 2:
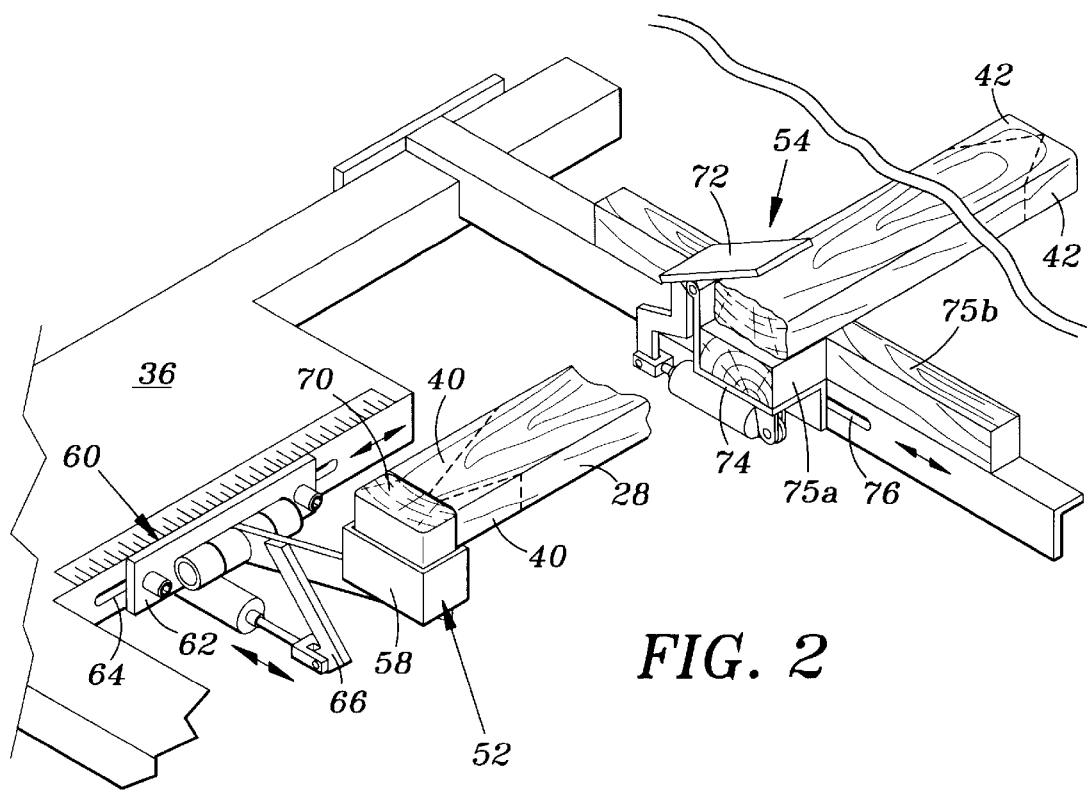
FIG. 2 is a more detailed perspective view of a stop and first clamp having a pre-cutting or opened position as shown in FIG. 1.
Figure 3:
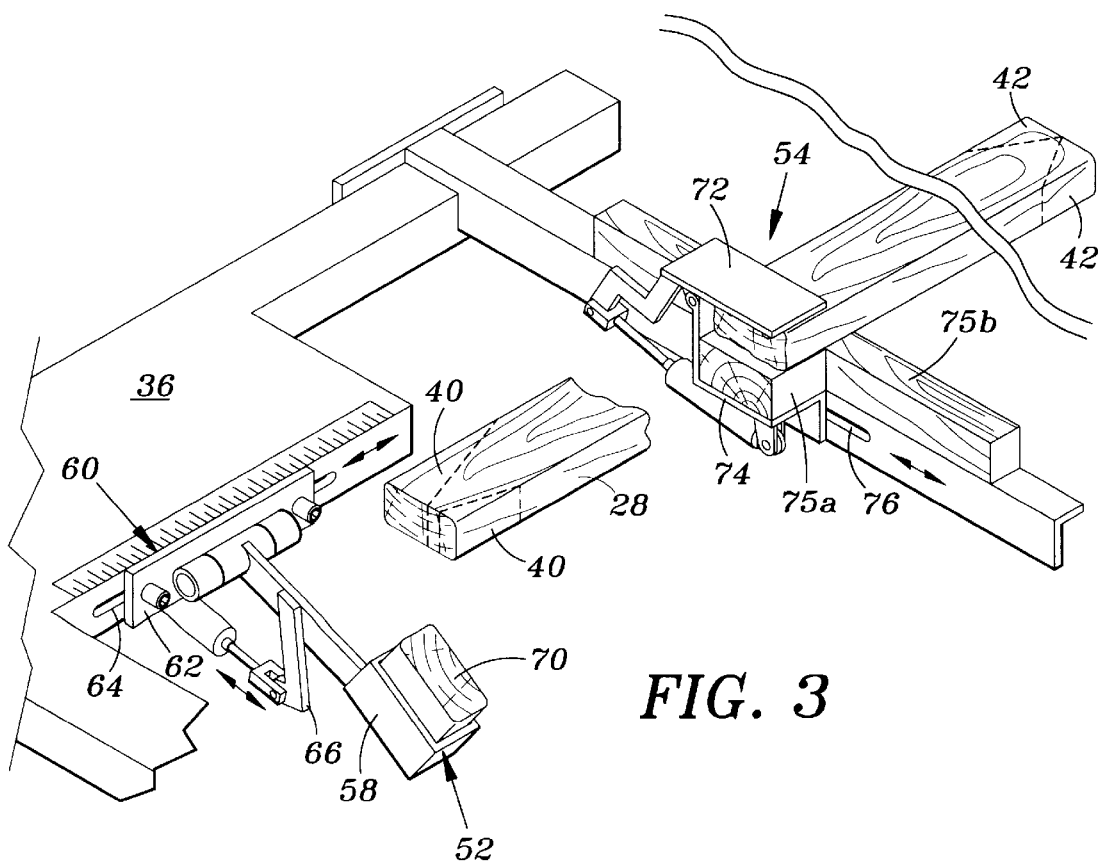
FIG. 3 is a more detailed perspective view of the stop and first clamp having a cutting position or closed position.

Referring to FIGS. 2 and 3, there are illustrated a stop 52, and a first clamp 54 in a pre-cutting position (see FIG. 2) and a cutting position (see FIG. 3). In the pre-cutting position the stop 52 located in an up position helps the operator to correctly and easily position the workpiece 28 onto the cutting system 100 without repeatedly measuring the proper location of the cut. Also in the pre-cutting position, the first clamp 54 and a second clamp 56 (FIG. 1) are in an opened position and capable of receiving the workpiece 28. During the cutting position the saws are enabled and the stop 52 moves into a down position below the workpiece 28 while the first and second clamps 54 and 56 are closed to secure the workpiece 28.

The stop 52 further includes a support housing 58 rotatably mounted to an adjustor 60 that is slidably mounted to the first saw assembly 36. The adjustor 60 is moved in a longitudinal direction along the first saw assembly 36 such that the cutting system 100 is configured to repeatedly cut the workpieces 28 to correct lengths. The adjustor 60 is preferably connected to the first saw assembly 36 using a plate 62 interlocked with a track 64 formed within the first saw assembly 36, however, various other connections are permissible. The track 64 may have a measuring scale to assist the operator in positioning the stop 52. The support housing 58 is drivingly engaged by a pivot arm 66 connected to a control system 68. The movement of the support housing 58 into the up position or down position is dependent upon a signal transmitted from the control system 68 that will be discussed in further detail later.

The stop 52 further includes a disposable piece 70 positioned in the support housing 58. The disposable piece 70 is adjacent to an end of the workpiece 28 while in the up position, and below the workpiece while in the down position. The disposable piece 70 is generally constructed of the same material used in the workpiece 28.

The first clamp 54 is secured to the first saw assembly 36 such that when the first saw assembly is repositioned on the frame 10 the first clamp automatically follows. The second clamp 56 is connected to the second saw assembly 38 or the frame 10.

The first and second clamps 54 and 56 each include a top arm 72 rotatably attached to a lower support 74 and drivingly attached to the control system 68. The lower support 74 is sized to support the workpiece 28. The top arm 72 is positioned to contact a top of the workpiece 28 during the cutting operation. Also, the top arm 72 releases the workpiece 28 after the cutting operation and remains open in order that another workpiece may be placed unto the lower support 74.

First and second clamps 54 and 56 further include disposable pieces 75a and 75b, generally constructed of the same material used in workpiece 28 to prevent saw blades of saw assemblies 36 and 38 from contacting lower support 74 and frame 12.

The first and second clamps 54 and 56 further include a clamp adjustor 76 connected to the lower support 74 and slidably mounted to the first saw assembly 36 and frame 10, respectively. The operator would move the clamp adjustor 76 in a transverse direction along the cutting system 100 to position the workpiece 28 in order to cut along a predetermined centerline of the workpiece. The clamp adjustor 76 is preferably connected to the first saw assembly 36 and the frame 10 in the same manner as the adjustor 60 associated with the stop 52 is connected to the first saw assembly.

Referring again to FIG. 1, there is illustrated a camber arm 78 rotatably connected to the frame 10, and located between the first and second clamps 54 and 56. The camber arm 78 when engaged contacts and exerts a transverse pressure to the near end of the workpiece 28 to remove a bow in workpiece 28 prior to the cutting operation. The camber arm is engaged prior to the cutting operation. After the cutting operation is complete the camber arm 78 is disengaged from the workpiece 28 thus permitting removal of the workpiece.

The control system 68 automates the first and second saw assemblies 36 and 38, and the multiple positions of the stop 52 and the first and second clamps 54 and 56. The control system 68 preferably uses a combination of electrical and pneumatic components to automate the cutting system 100. The operator interfaces the control system 68 via a control panel 80 generally located on the front side 20 of the frame 10. The control panel 80 may be moved along the frame 10 to accommodate the operator. Additional control panels that are wired in parallel may be provided at various locations on or around the cutting system 100.

In operation, the operator adjusts the location of the first saw assembly 36, the stop 52 and the first and second clamps 54 and 56 such that the workpiece 28 will be properly cut. Thereafter, a stacker would place an uncut workpiece 28 unto the infeed conveyor 14 and push it toward the operator.

The operator would then place the uncut workpiece 28 into the first and second clamps 54 and 56 that are in the open position. At the same time, the operator would push an end of the workpiece 28 next to the stop 52 that is in the up position. The camber arm 78 is also actuated by the operator to contact and control camber of the workpiece 28. After the uncut workpiece 28 is positioned as described, the operator would actuate a clamp button 82 located in the control panel 80 that causes the first and second clamps 54 and 56 to move into a closed position. While the clamp button is being held the operator would depress one of the plurality of saw buttons 84 to start the cutting operation. For safety concerns the preferred control configuration requires the operator to have both hands on the control panel 80 during the cutting process. An emergency button 86 is also located within the control panel 80 and when actuated will immediately remove all electrical and pneumatic energy from the cutting system 100.

During the cutting process, the front and back sections 40 and 42 that are removed from the workpiece 28 fall unto the waste conveyor 18. The waste conveyor 18 transports the scrap material 34 to an appropriate location away from the cutting system 100.

After the cutting process is complete the operator releases the control panel 80 and removes the finished workpiece 28. The finished workpiece 28 is then pushed down the outfeed conveyor 16 towards the stacker. The stacker then grabs and stacks the cut workpiece 28. In the meantime, the operator would be positioning another workpiece 28 to be cut by the same operation described above.

When the operator operates cutting system 100 without the assistance of a stacker, the operator would load and unload workpieces 28 from the front side 20 of frame 10 and not use infeed conveyor 14 or outfeed conveyor 16.

While the present invention has been described with reference to the illustrated embodiment, it is not intended to limit the invention but, on the contrary, it is intended to cover such alternatives, modifications and equivalents as may be included in the spirit and scope of the invention as defined in the following claims.

What is claimed:

1. A cutting system for removing at least one section from a workpiece having ends, comprising:

a frame having a top, a bottom, a front side, and a back side;

first and second saws attached to the top of the frame and each saw being disposed adjacent to the back side of the fame;

the first and second saws being independently and adjustably mounted above the frame, such that each saw is suspended for rotation about a single axis vertically disposed with respect to the frame for cutting movement across the workpiece held on the frame, in a plane parallel to the top of the frame, the saws being capable of making angled cuts by linear movement;

an infeed conveyor positioned on the top and front side of the frame;

an outfeed conveyor positioned on the top and front side of the frame and offset from the infeed conveyor toward the back side of the frame;

a waste conveyor positioned on the frame below the outfeed conveyor;

a stop connected to the first saw having an up position and a down position, said stop positioned adjacent an end of the workpiece while in the up position and below the workpiece while in the down position during operation of the first and second saws;

a clamp connected to the frame adjacent to the back side and having an opened position and a closed position;

the clamp securing the workpiece in the closed position during operation of the first and second saws, and the clamp releasing the workpiece in the opened position, and a control system for controlling the first and second saws, the stop, and the clamp.

2. The cutting system in accordance with claim 1 wherein the stop further includes means for longitudinally adjusting a location of the stop relative to the first saw.

3. The cutting system in accordance with claim 2 wherein the stop further includes a support housing rotatably connected to the means for adjusting and drivingly connected to the control system.

4. The cutting system in accordance with claim 3 wherein the stop further includes a disposable piece disposed in the support housing, said disposable piece adjacent the end of the workpiece in the up position and below the workpiece in the down position.

* * * * *